July 16, 1946.  R. F. WILD  2,404,344
MEASURING AND CONTROLLING APPARATUS
Filed July 7, 1944   4 Sheets-Sheet 1

INVENTOR.
RUDOLF F. WILD
BY
CB Spangenberg
ATTORNEY.

July 16, 1946.   R. F. WILD   2,404,344
MEASURING AND CONTROLLING APPARATUS
Filed July 7, 1944   4 Sheets-Sheet 2

INVENTOR.
RUDOLF F. WILD
BY
C. B. Spangenberg
ATTORNEY.

July 16, 1946.  R. F. WILD  2,404,344

MEASURING AND CONTROLLING APPARATUS

Filed July 7, 1944  4 Sheets—Sheet 3

*INVENTOR.*
RUDOLF F. WILD
BY
C. B. Spangenberg
ATTORNEY.

July 16, 1946.   R. F. WILD   2,404,344
MEASURING AND CONTROLLING APPARATUS
Filed July 7, 1944   4 Sheets-Sheet 4

INVENTOR.
RUDOLF F. WILD
BY
*C B Shangenberg*
ATTORNEY.

Patented July 16, 1946

2,404,344

UNITED STATES PATENT OFFICE 2,404,344

MEASURING AND CONTROLLING APPARATUS

Rudolf F. Wild, Philadelphia, Pa., assignor to The Brown Instrument Company, Philadelphia, Pa., a corporation of Pennsylvania Application July 7, 1944, Serial No. 543,892

19 Claims. (Cl. 172—239)

The present invention relates to measuring and controlling systems, and more particularly, to electrical systems for measuring, indicating, recording and/or controlling variable conditions such as temperature, pressure, liquid level and flow, and also has utility for telemetering, torque amplifying, boat steering, remote control and repeater positioning purposes.

A general object of the invention is to provide improved electrical systems of the above mentioned character.

In my copending application Serial No. 537,505 filed on May 26, 1944, I have disclosed and claimed various apparatus embodiments of an electrical measuring and controlling system of the type described above. These apparatus embodiments are characterized in that they comprise tunable means including, in combination, an oscillator which generates a relatively high frequency, means to amplitude modulate the high frequency current at the frequency of oscillation of a relatively low frequency current, balanced high frequency discriminating means responsive to the frequency of the modulated high frequency current and operative to create a signal voltage of one phase or of opposite phase oscillating at the low frequency and having a magnitude depending, respectively, upon the direction and extent of deviation of the high frequency current from a predetermined value, and phase responsive motive structure controlled by said derived oscillating signal voltage. The phase responsive motive structure is employed to adjust the frequency of oscillation of the high frequency current, or alternatively, the frequency value to which the discriminating means is tuned, as required to reduce to zero the low frequency signal voltage and thereby to balance the system.

The present invention is directed to improvements in electrical measuring and controlling systems of the same character as those disclosed in my above mentioned copending application. In the apparatus embodiments of the present invention which have been disclosed, the tunable means includes, in addition to the means for generating a low frequency oscillating signal voltage according to the direction of deviation of the frequency value of the high frequency current from a predetermined value, means to create a second oscillating signal voltage of said low frequency which is mixed with the first mentioned signal voltage of low frequency, and means controlled by the resultant of the two low frequency oscillating signal voltages to effect adjustment, by means of the actuation of the motive structure, of the second low frequency signal voltage to such a value that the mixed or resultant signal voltage is reduced to zero when the system is balanced or stabilized. The provision of such an arrangement forms a primary object of the present invention.

Another object of the invention is the provision of such an electrical measuring and controlling system wherein the high frequency discriminating means may or may not be of the balanced type as desired.

A further object of the invention is the provision of such a system wherein the adjustments in the second mentioned low frequency signal voltages may be effected by variation in resistance, inductance or capacitance, as desired.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1:
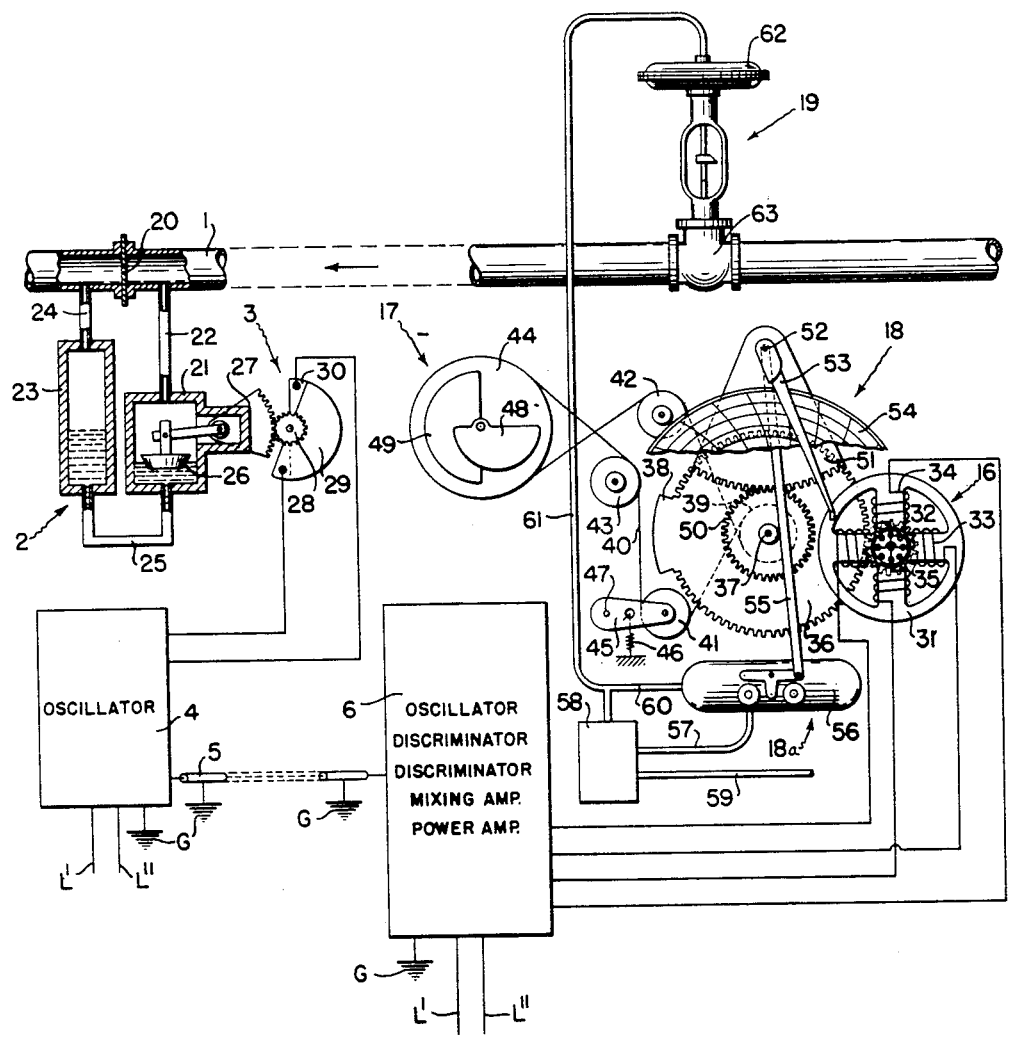
Fig. 1 is a diagrammatic illustration of one embodiment of the invention.

In Fig. 1 I have illustrated, in a more or less diagrammatic manner, a measuring, indicating, recording and controlling system for measuring, indicating, recording and controlling the rate of flow of a fluid through a pipe or a conduit 1. The rate of flow of a fluid through the pipe 1 is detected by a manometer which is designated at 2 and is arranged to operate a variable condenser designated by the numeral 3 for detuning a resonant electrical circuit comprising a high frequency oscillator 4 in the frequency determining circuit of which the variable condenser is connected. The high frequency oscillator 4 is utilized as a generator and transmitter of high frequency current and is connected to and receives energizing current from alternating current supply lines L' and L''. The high frequency current output derived from the oscillator 4 is of variable frequency dependent upon the adjustment of the variable condenser 3 and is conveyed by means of a transmission line, which may comprise a co-axial cable 5, to a receiver which has been designated by the reference character 6. As will become evident as the description proceeds, the high frequency signal currents from the generator 4 may be transmitted to the receiver 6 by wireless or radiation as well as by means of transmission line 5.

Figure 2:
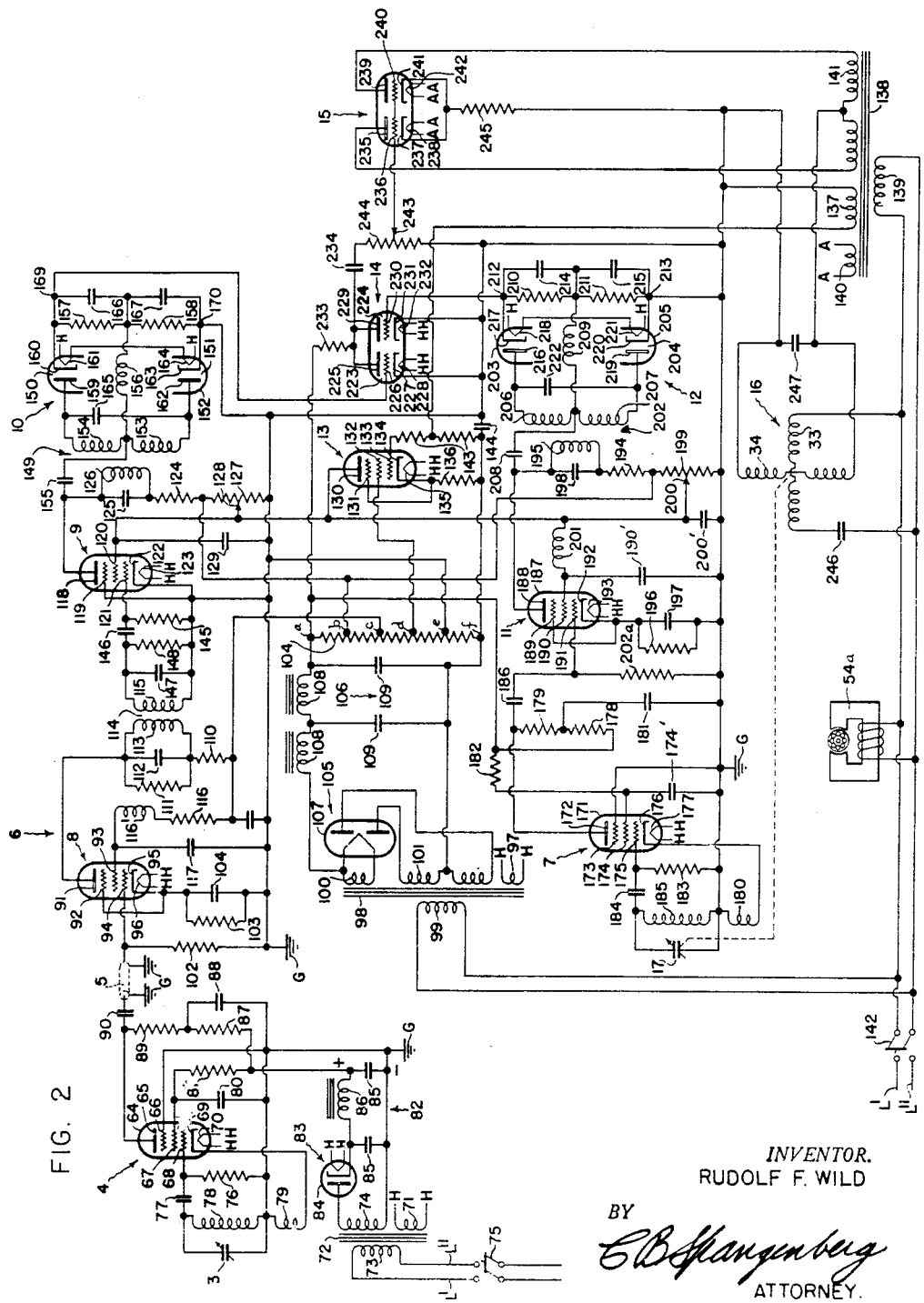
Fig. 2 illustrates the electrical circuit arrangement of the apparatus of Fig. 1.

The receiver 6 in the embodiment of the invention shown in Fig. 2 includes two channels. The high frequency current transmitted to the receiver 6 from the generator 4 is impressed on the first of these channels and a high frequency current generated by an oscillator 7 located within the receiver 6 is impressed on the second of the channels. Of the two channels, the first includes an amplifier 8, a limiter 9 which may be a conventional amplitude limiter of the type employed in frequency modulation broadcast receivers, and also a balanced frequency discriminator 10. The second channel includes the oscillator 7, a buffer 11, and a balanced frequency discriminator 12 which may be and has been shown as being identical to the frequency discriminator 10. The receiver 6 also includes a keyer 13 for amplitude modulating the high frequency output current from the limiter 9 and the buffer 11 during recurring time intervals of an oscillation of relatively low frequency for the purpose of producing at the output of each of the discriminators 10 and 12 an output voltage undulating or fluctuating at said low frequency and of one phase or of opposite phase, depending upon the frequency values of the high frequency current output from each of the oscillators 4 and 7.

When the frequencies of oscillation of the modulated high frequency currents impressed on each of the discriminators 10 and 12 are the values to which the discriminators 10 and 12 are tuned, the output voltage of each of the discriminators is substantially zero. As will be evident, the frequency values to which each of the discriminators is tuned may be the same, or if desired, the discriminators may be tuned to different frequency values. Variation in the frequencies of oscillation of the modulated high frequency currents impressed on each of the discriminators 10 and 12 from the value or values to which the discriminators are tuned causes an undulating voltage to appear at the output terminals of each discriminator. Those undulating voltages are of one phase or of opposite phase depending upon the direction of the change in frequency. In accordance with the present invention the magnitudes of the two undulating voltages are compared to each other and when they are of unequal amplitude suitable motive structure to be described is set into operation to equalize the two undulating voltages. Specifically, upon unbalance of the apparatus due to variation in the adjustment of the condenser 3 by the manometer 2 in response to a change in the rate of flow of fluid through the conduit 1, the amplitude of the undulating voltage produced at the output terminals of discriminator 10 is correspondingly varied. The change in that undulating voltage is utilized to actuate the motive structure referred to and that actuation is employed to rebalance the apparatus by effecting a corresponding change in the amplitude of the undulating voltage produced at the output terminals of the discriminator 12. This result is obtained by adjustment of the frequency of oscillation of the oscillator 7 by the motive structure.

In order to accomplish this result, the undulating or signal voltages created at the output terminals of each of the discriminators 10 and 12 are impressed on a mixing amplifier which has been designated by the reference numeral 14 to produce a resultant voltage in the output circuit of the mixing amplifier having an undulating component which is zero in value or of one phase or of opposite phase depending upon whether the amplitude of the signal voltage produced at the output of the discriminator 10 is respectively equal to or less than or greater than the amplitude of the signal voltage created at the output terminals of the discriminator 12. This undulating resultant voltage is impressed on the input terminals of a power amplifier indicated at 15 which is provided to control the selective energization for rotation in one direction or the other of a two-phase reversible electrical motor generally designated at 16. As shown, the motor 16 is an induction motor of the rotating field type and is arranged to adjust a variable condenser 17 connected in the frequency discriminating circuit of the oscillator 7 for accomplishing the desired rebalancing operations of the apparatus. As may be seen by reference to Fig. 1, the motor 16 also operates indicating and recording mechanism generally designated at 18 and control apparatus shown at 18a which in turn operates controlling means designated by the character 19 for controlling the flow of fluid through the pipe 1.

The manometer 2 for ascertaining the rate of fluid flow through the pipe 1 may be of any known type and, as shown, includes an orifice plate 20 which is positioned in the pipe 1 for creating a pressure differential across the orifice plate 20 which varies in accordance with the rate of fluid flow through the pipe. The pressure differential so produced is a square root function of the rate of flow through the pipe 1. Manometer 2 also includes a high pressure chamber 21 which is connected by a tube 22 to the high pressure side of the orifice plate 20, and includes a low pressure chamber 23 which is connected by a tube 24 to the low pressure side of the orifice plate 20. The low pressure chamber 23 and the high pressure chamber 21 communicate with each other through a tube 25.

The relative levels of mercury or other suitable liquid located within the pressure chambers 21 and 23 vary in accordance with the pressure difference within those chambers, and consequently, provide a measure of the rate of fluid flow through the pipe 1. A member 26 which floats on the mercury in the high pressure chamber 21, and therefore, rises and falls in accordance with the variations in pressure differential in the two chambers 21 and 23 is arranged to angularly deflect a gear sector 27. The gear sector 27 meshes with a gear 28 which is arranged to operate the detuning means or variable condenser 3. As shown, the variable condenser 3 comprises movable condenser plates 29 which are deflected relatively to stationary condenser plates 30 upon angular deflection of the gear sector 27. For purposes of illustration, an increase in the rate of fluid flow through the pipe 1 may be assumed to cause the condenser plates 29 to rotate in a clockwise direction to decrease the capacitance between the condenser plates 29 and 30.

As shown in Fig. 1, the reversible electrical motor 16 includes a stator 31 and a rotor 32 which is provided with suitable conductor bars. A power winding 33 and a control winding 34 are wrapped around suitable pole pieces provided on the stator 31. Depending upon the phase relation of the electrical current flowing through the control winding 34 with respect to the current flow through the power winding, as is more fully explained hereinafter, the rotor 32 is actuated for rotation in one direction or the other to cause rotation of a pinion gear 35 in one direction or the other. The pinion gear 35 drives a gear 36 which is carried by a shaft 37 and is provided with a projection 38 which abuts against the pinion gear 35 for the purpose of limiting the extent of rotation of the gear 36.

Gear 36 carries a cable drum 39 which operates a cable 40 strung over pulleys 41, 42, 43 and 44. The pulley 41 is carried by a lever 45 which is biased by a spring 46 in a clockwise direction about the pivot point 47 of the lever to maintain the cable 40 taut. The pulley 44 is arranged to operate the retuning means or variable condenser 17 which, as shown in Fig. 1, comprises a variable condenser having movable condenser plates 48 adapted to be rotated with respect to relatively stationary condenser plates 49 upon rotation of the pulley 44. The retuning means 17, therefore, is adjusted in accordance with the angular positions assumed by the rotor 32 of the motor 16.

The shaft 37 which carries the gear 36 may operate an indicating pointer (not shown) with respect to a suitably calibrated indicating scale (not shown). Also mounted on the shaft 37 is a gear 50 which meshes with a gear sector 51 so that upon operation of the motor 16 the gear sector 51 is rotated about its pivot 52. The gear sector 51 positions a pen arm 53 with respect to a slowly rotating chart 54 for the purpose of providing a continuous record of the rate of fluid flow through the pipe 1 on the chart 54. Chart 54 is driven at a constant, slow speed by a unidirectional synchronous motor 54a which, as shown in Fig. 2, is supplied with energizing alternating current from supply lines L' and L". The gear sector 51 also operates an arm 55 which is arranged to adjust the position of the flapper of a pneumatic control device 56 forming part of the control apparatus 18a. The pneumatic control device 56 may be of the type shown and described in Patent No. 2,125,081 which was issued to C. B. Moore on July 26, 1938, and includes a nozzle valve which is disposed in cooperative relation to the flapper and is connected by a bleed line 57 to a pilot valve 58 supplied with air under pressure by a pipe 59. The pressures developed by the pilot valve 58 are transmitted through a pipe 60 to the pneumatic control device 56 and by a pipe 61 to a pneumatic motor 62 which operates a valve 63 in the control means 19 for controlling the rate of fluid flow through the pipe 1. The pneumatic control apparatus including the control device 56, the pilot valve 58, and the control means 19 may advantageously be utilized for the purpose of maintaining the rate of fluid flow through the pipe 1 at a substantially constant value.

The details of construction of the reversible motor 16, the indicating and recording apparatus 18, and the pneumatic control apparatus 18a do not constitute any part of the present invention, and moreover, are completely illustrated and described in a copending application of Walter P. Wills, Serial No. 421,173 filed on December 1, 1941, and therefore, further description thereof is not considered necessary herein.

As previously noted, the wiring diagram of the electronic apparatus employed in the apparatus embodiments of Fig. 1 and controlled jointly by the variable condenser or detuning means 3, and by the variable condenser or retuning means 17 for selectively controlling the rotation and direction of rotation of the reversible motor 16, is more or less diagrammatically illustrated in Fig. 2.

Transmitter oscillator 4, as shown in Fig. 2, is an electron coupled oscillator and includes a pentode tube 64 which may be of the commercially available type 6SJ7. The tube 64 includes an anode 65, a suppressor grid 66, a screen grid 67, a control grid 68, a cathode 69 and a heater filament 70. The heater filament 70 is connected to and receives energy from the secondary winding 71 of a transformer 72 having a line voltage primary winding 73 and a high voltage secondary winding 74 in addition to the low voltage secondary winding 71. Line voltage primary winding 73 is connected to the alternating current supply lines L' and L". The supply lines L' and L" lead from a source of alternating current (not shown) which supplies alternating current of relatively low frequency, for example, alternating current having a frequency of 60 cycles per second although it will be understood that other frequencies of alternation may be employed equally as well. A switch 75 is provided at the transmitter to control the application of electrical energy to the apparatus from the supply lines L' and L".

Control grid 68 of the pentode tube 64 is connected through a resistance 76 to ground G and is also connected through a condenser 77 to one terminal of a parallel circuit including the variable condenser 3 in one branch and an inductance coil 78 in the other branch. The other terminal of the parallel circuit is connected to ground G. The inductance coil 78 is inductively coupled to a coil 79 and together with condenser 3 provides for high frequency operation of the oscillator. The cathode 69 is connected through the inductance coil 79 to ground G. Screen grid 67 is connected through a condenser 80 to ground G and is also connected through a resistance 81 to the positive terminal of a source of unidirectional voltage created at the output terminals of filter 82 by the transformer secondary winding 74 and a rectifier designated at 83. The negative terminal of the filter 82 is connected to ground G.

The rectifier 83 is of the half wave type and its circuit may be traced from one terminal of the transformer secondary winding 74 to the anode of a diode 84, and the cathode thereof to the positive input terminal of the filter 82. The negative input terminal of the filter 82 is connected to the other terminal of the winding 74 and to ground G. The filament of the diode 84 is connected to and receives energizing current from the transformer secondary winding 71. Filter 82 includes a pair of suitable condensers 85 and a choke coil 86 for filtering the unidirectional voltage applied to the screen grid 67 of the pentode tube 64. The filter 82 also includes a resistance 87 and a condenser 88 for further filtering the unidirectional voltage output of the rectifier 83 for providing a unidirectional voltage substantially free from ripple which is impressed on the anode circuit of the pentode tube 64. As shown, anode 65 is connected through a resistance 89 to the point of connection of the resistance 87 and condenser 88. The suppressor grid 66 is connected directly to ground G and serves the usual purpose of decreasing secondary emission from the anode 65.

The oscillating circuit of the oscillator 4 includes the control grid circuit of which the parallel network including the detuning means or condenser 3 forms a part and also includes the screen grid circuit which may be traced from the positive output terminal of the filter 82 through resistance 81, screen grid 67, cathode 69, inductance coil 79 and ground G to the negative terminal of the filter 82. These control grid and screen grid circuits are inductively coupled by the inductance coils 78 and 79 and provide for high frequency operation over a range of frequencies which desirably may be in the region of 4.3 megacycles per second.

In order that the high frequency oscillating currents conducted through the screen grid circuit may cause the voltage of the anode 65 to oscillate at the same high frequency, the anode 65 of the oscillator tube is electron coupled to the screen grid 67. The high frequency oscillating circuit for the anode 65 may be traced from the positive terminal of the filter 82 comprising the point of connection of resistance 87 and condenser 88 through resistance 89, anode 65, cathode 69 and inductance coil 79 to the grounded and negative terminal of the filter.

While the anode or output circuit of the oscillator 4 is shown in Fig. 2 as being directly coupled by means of a condenser 90 to the transmission line 5 and thereby to the input circuit of the receiver 6, it will be understood that stages of amplification and isolation and an impedance matching network may be employed if desired.

The amplifier 8 contained in the receiver 6 comprises a radio frequency amplifier and is employed to amplify the high frequency signal currents conveyed to the receiver over the transmission line 5. Specifically, the amplifier 8 comprises a pentode tube of the commercially available 6SJ7 type and includes an anode 91, a suppressor grid 92, a screen grid 93, a control grid 94, a cathode 95 and a heater filament 96. Energizing current is supplied to the heater filament 96 from the low voltage secondary winding 97 of a transformer 98 located in the receiver 6 and having a line voltage primary winding 99, a low voltage secondary winding 100, and a center tapped high voltage secondary winding 101 in addition to the low voltage secondary winding 97.

The input circuit of the amplifier 8 comprises a circuit interconnecting the control grid 94 and the cathode 95 and may be traced from the control grid 94 through a resistance 102 to ground G and through a parallel connected resistance 103 and a condenser 104 to the cathode 95. As shown, the transmission line 5 is connected directly to the control grid 94, the outer shield of the line 5 being connected to ground G. Thus the high frequency signals generated by the oscillator 4 and transmitted to the receiver 6 by the transmission line 5 are impressed on the input circuit of the amplifier 8.

Energizing voltage is supplied to the screen and anode circuits of the amplifier 8 from a voltage divider resistance 104 which is provided with a number of voltage taps and across which a unidirectional voltage is maintained by means of a full wave rectifier designated at 105 and a filter indicated at 106. The rectifier 105 includes a rectifier tube 107 having a pair of anodes and a filament type cathode having its terminals connected to the low voltage transformer secondary winding 100. One anode of the tube 107 is connected to one end terminal of the high voltage secondary winding 101 and the other end terminal of that high voltage winding is connected to the second anode of the tube 107. The filament of tube 107 is connected to one input terminal of the filter 106 while the other input terminal of the filter is connected to the center tap of the transformer secondary winding 101. Filter 106, as shown, includes suitably connected inductances 108 and condensers 109. As will become apparent as the description proceeds, the unidirectional voltage produced across the voltage divider resistance 104 is also utilized to energize the oscillator 7, the limiter 9, buffer 11, amplifier 14, and the keyer 13 in addition to energizing the screen and anode circuits of the amplifier 8.

The anode circuit of the amplifier 8 may be traced from the potential point c on the voltage divider 104 through a resistance 110, a parallel circuit including a resistance 111 in one branch, a condenser 112 in a second branch and a primary winding 113 of a transformer 114, having a secondary winding 115, in a third branch to the anode 91, the cathode 95, the parallel connected resistance 103 and condenser 104 to ground G and thereby to the potential point e on the voltage divider. The point c on the voltage divider resistance 104 is so chosen as to be positive by a suitable amount with respect to the potential of the point e.

Suppressor grid 92 is directly connected to the cathode 95 and is employed for the usual purpose of minimizing secondary emission from the anode 91.

The screen grid circuit of the amplifier 8 may be traced from the point c on the voltage divider resistance 104 through a resistance 116 and a radio frequency choke coil 116' to the screen 93, cathode 95, and the parallel connected resistance 103 and condenser 104 to the grounded potential point e on the voltage divider resistance. The screen 93 also is directly connected by a condenser 117 to ground G.

The amplifier high frequency signal currents which flow through the output circuit of the amplifier 8 are conveyed by the transformer 114 to the input circuit of the limiter 9. As previously noted, the limiter 9 may be of the type conventionally employed in frequency modulation broadcast receivers. Specifically, limiter 9 may comprise a pentode tube of the commercially available 6SJ7 type and includes an anode 118, a suppressor grid 119, a screen grid 120, a control grid 121, a cathode 122, and a heater filament 123. Energizing current is supplied to the heater filament 123 from the low voltage transformer secondary winding 97.

Anode voltage is supplied to the limiter 9 through a circuit which may be traced from the potential point b on the voltage divider 104 through a resistance 124 to a parallel network including a condenser 125 in one branch and the primary winding 126 of discriminator 10 in the other branch to the anode 118 and the cathode 122 to the grounded potential point e on the voltage divider 104.

Energizing voltage is supplied to the screen 120 from a portion of the voltage divider 104 shunted by a resistance 127 which, as shown, is connected between the potential points b and e on the voltage divider. A contact 128 in engagement with the resistance 127 is provided for facilitating adjustment of the voltage impressed on the screen grid 120. The screen grid circuit may be traced from the contact 128 to the screen grid 120 and the cathode 122 to the grounded potential point e. Screen grid 120 is also directly connected to ground G by a condenser 129. The suppressor grid 119 is directly connected to the cathode 122.

In accordance with the present invention, a second circuit is also provided for applying an energizing voltage to the screen grid 120. This second circuit is so arranged as to apply a fluctuating or undulating voltage of relatively low frequency, compared to the frequency of the oscillating currents generated by oscillator 4, to the screen grid 120 for the purpose of amplitude modulating the high frequency current output from the limiter 9 at said relatively low frequency. For this purpose the keyer 13, which may comprise a commercially available type 6SJ7 tube, is provided.

The keyer 13 includes an anode 130, a suppressor grid 131, a screen grid 132, a control grid 133, a cathode 134, and a heater filament 135. Energizing current is supplied the heater filament 135 from the transformer secondary winding 97. The suppressor grid 131 is directly connected to the cathode 134. Anode voltage is supplied the keyer 13 from the voltage divider resistance 104 through a circuit which may be traced from the contact 128 in engagement with resistance 127 to the anode 130, cathode 134 and a cathode biasing resistance 136 to the negative terminal f of the voltage divider resistance 104. As shown, the anode 130 is directly connected to the screen grid 120 of the limiter tube 9. Screen grid voltage is supplied the keyer 13 through a circuit which may be traced from the potential point d on the voltage divider resistance to the screen grid 132, cathode 134, and the cathode biasing resistance 136 to the negative terminal f of the voltage divider resistance.

An alternating voltage of relatively low frequency is impressed on the control grid 133 of the keyer tube 13 from the secondary winding 137 of a transformer 138 also having a line voltage primary winding 139, a low voltage secondary winding 140, and a center tapped high voltage secondary winding 141. The line voltage primary winding 139 has its terminals connected to a source of alternating current which may be of the same frequency as that supplied by the supply lines L' and L'' at the transmitter 4. For convenience of illustration the primary winding 139 has been shown as being connected through a switch 142 to the supply lines L' and L''. When the transmitter 4 and the receiver 6 are located at a great distance from each other, however, it will be evident that the supply lines L' and L'' at the transmitter and the supply lines L' and L'' at the receiver will probably not be supplied from the same source. This circumstance does not interfere with or detract from the operation of the apparatus of my invention, however, inasmuch as it is not necessary to the operation of the invention that the receiver and the transmitter be energized from the same source of alternating current. Moreover, the energizing current source for the transmitter 4 need not be a source of alternating current, but if desired, may comprise a battery, in which case the rectifier 83 and filter 82 may be eliminated. Likewise, the energizing current source for the receiver 6 may be a battery the use of which permits elimination of rectifier 105 and filter 106. When a battery is employed as the energizing source for receiver 6, however, some additional means must be provided for creating the low frequency potential impressed on the control grid circuit of the keyer 13 and also for creating a voltage of the same low frequency for energizing the output circuits of the power amplifier 15.

The control grid circuit for the keyer 13 comprises two branches, one of which may be traced from the control grid 133 through a resistance 143 and the cathode biasing resistance 136 to the cathode 134. The other branch comprises a connection from one terminal of the transformer secondary winding 137, to a tap provided on resistance 143, the other secondary winding terminal being connected to ground G and through a condenser 144 to the point of connection of resistances 143 and 136. As those skilled in the art will understand the impression on the control grid circuit of pentode tube 13 of an alternating voltage derived from the supply lines L' and L'' causes the potential of the anode 130 to undulate with an approximately square wave form at the frequency of the voltage of the said supply lines, and hence, causes the potential of the screen grid 120 of limiter 9 to similarly undulate. In this manner, the high frequency current output of the limiter 9 is amplitude modulated at the relatively low frequency of the voltage supplied by supply lines L' and L''. Thus, when the frequency of alternation of the voltage of supply lines L' and L'' is 60 cycles per second, the high frequency current output of the limiter 9 is amplitude modulated at the frequency of 60 cycles per second.

For the purposes of the present invention, the modulating or keying of the high frequency currents at the frequency of the low frequency current need not be 100% amplitude modulation inasmuch as the embodiments of the invention disclosed will operate satisfactorily if the modulation is less than 100%. In order to attain the most efficient operation, however, it is desirable for the high frequency current output of the limiter 9 to be substantially 100% modulated or keyed with a square wave. By so modulating or keying the output of the limiter 9, the greatest possible output voltage of one phase or of opposite phase is produced across the output terminals of discriminator 10 for a given change in adjustment of the detuning condenser 3.

With respect to its limiting function, the limiter 9 is essentially an amplifier stage which saturates at a predetermined level depending upon the circuit constants, and is employed for the purpose of limiting the amplitude of the high frequency signal currents in order to make the amplitude of the modulated high frequency signal currents impressed on the input circuit of the discriminator 10 independent of variations in the amplitude of the high frequency signal currents received by the receiver 6 over the transmission line 5, and thereby, independent of variations in the transmission line characteristics and of variations in the energizing voltage supply sources.

The control grid circuit of the limiter 9 includes a resistance 145 connected between the control grid 121 and the cathode 122 and also includes a network shunting the resistance 145 comprising a condenser 146 in series with a parallel network consisting of the transformer secondary winding 115 in one branch, a condenser 147 in a second branch, and a resistance 148 in a third branch. The values of these elements in the input circuit are so chosen in relation to the voltages impressed on the screen grid and anode circuits that the limiter 9 saturates when the high frequency signal currents created in the transformer secondary winding 115 reach a desired maximum value. Further increases in the magnitude of the high frequency signal currents are then ineffective to produce any change in the magnitude of the modulated high frequency signal currents which flow through the primary winding 126 of the discriminator 10, which primary winding, as shown and previously noted, is connected in the anode circuit of limiter 9.

The frequency discriminator 10 includes a transformer 149 and a pair of diode rectifiers 150 and 151 which desirably may be contained within a single envelope generally designated at 152. The transformer 149 is comprised of the primary winding 126 and a split secondary winding, one section of which has been designated 153 and the other 154. The center tap of the split secondary winding, comprising the point of connection of the adjacent ends of the secondary winding sections 153 and 154, is connected through a blocking condenser 155 to the anode 118 of the limiter 9, and is also connected to the upper terminal of the transformer primary winding 126. That center tap is also connected through a choke coil or inductance 156 to the point of engagement of a pair of resistances 157 and 158. The usable output voltage from the frequency discriminator 10 is obtained across the resistances 157 and 158 and appears between the discriminator output terminals 169 and 170.

The diode rectifiers 150 and 151 may be contained within a single tube such as the commercially available type 6H6. Specifically, the diodes each include anode, cathode and heater filament elements indicated by the respective numerals 159, 160 and 161 in the diode 150 and by the respective numerals 162, 163 and 164 in the diode 151. Each of the heater filaments 161 and 164 are connected to and receive energizing current from the transformer secondary winding 97. The cathode 160 of diode 150 is connected through the resistance 157 and the inductance 156 to the center tap on the split secondary winding, and the cathode 163 of the diode 151 is also so connected through the resistance 158 and the inductance 156. Anode 159 is connected to the end terminal of the split secondary winding section 154 while anode 162 is connected to the end terminal of the secondary winding section 153. A condenser 165 is provided in parallel to the split secondary winding, as shown, for tuning the latter to a desired frequency in the region of 4.3 megacycles, and if desired, may be so chosen as to tune the split secondary winding precisely to that frequency value. Each of the resistances 157 and 158 are shunted by a respective condenser 166 and 167. The blocking condenser 155 and the condensers 166 and 167 are so selected as to present low impedance to the high frequency oscillating currents flowing through them. The condenser 125 and the transformer primary winding 126 are so selected as to provide high impedance in order to produce a large output signal voltage from the discriminator. Preferably, the condenser 125 is so chosen as to tune the primary winding 126 to the same frequency as that to which the split secondary winding is tuned.

When the frequency of the modulated high frequency signal currents impressed on the transformer primary winding 126 is 4.3 megacycles, assuming that both the primary winding 126 and the split secondary winding are tuned to this frequency, the voltages in the split secondary winding sections 153 and 154 and appearing across the terminals of the split secondary winding will be 90° out of phase with the applied primary voltage. This voltage relationship is shown graphically in Fig. 3 wherein the vector $E_{126}$ represents the voltage applied to the primary winding 126 and the vectors $E_{153}$ and $E_{154}$ represent the voltages appearing across the split secondary winding sections 153 and 154, respectively. The phenomena giving rise to the 90° phase shift between the secondary and primary voltages is one known in the art and needs no explanation herein.

Figure 3:
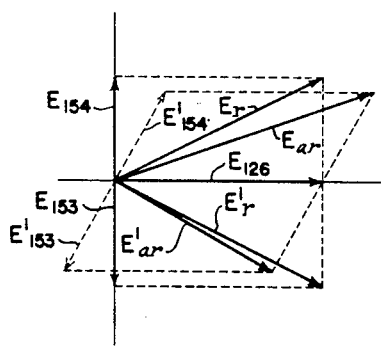
Figs. 3, 4 and 5 are graphs illustrating the operation of both of the frequency discriminators of the arrangement of Fig. 2.

The secondary winding sections 153 and 154 are so wound on the transformer 149 that the voltage appearing across the winding 154 is 180° out of phase with the voltage appearing across the winding 153, as is shown in Fig. 3. The voltage appearing across the secondary winding 154 is impressed on the circuit including the diode rectifier 150 and resistance 157 while the voltage appearing across the secondary winding 153 is impressed on the circuit including diode 151 and resistance 158. Superimposed on these voltages impressed on the diodes 150 and 151 is the voltage developed across the primary winding 126. The primary voltage is superimposed on the diodes 150 and 151 since the upper terminal of the primary winding 126 is connected through the blocking condenser 155 to the point of engagement of the secondary winding sections 153 and 154. Thus, the primary voltage is impressed in series with the voltage produced across the secondary winding section 154 on the circuit including diode 150 and resistance 157, and the primary voltage is impressed in series with the voltage produced across the secondary winding 153 on the circuit including diode 151 and resistance 158. The resultant voltage impressed on the circuit including the diode 150 is the vector sum of the primary voltage $E_{126}$ and the secondary voltage $E_{154}$, represented in Fig. 3 by the vector $E_r$. The vector $E'_r$ represents the resultant voltage impressed on the circuit including diode 151. In each case the resultant voltage on each diode is the vector sum of two voltages which are in phase quadrature at resonance. The secondary voltage applied to the diode 150, however, leads the primary voltage by 90° while the secondary voltage applied to the diode 151 lags by 90° the primary voltage. The absolute values of the primary and secondary voltages in relation to each other are not critical and may be selected as desired.

The 90° phase relationship between the voltage applied to the primary winding 126 and the voltages appearing across the secondary winding sections 153 and 154 exists only when the applied frequency to the primary winding 126 is the value to which both the primary winding and the split secondary winding are resonant. Upon departure of the applied frequency from this value, the voltage appearing across the secondary winding sections 153 and 154 also departs from the 90° phase relationship with the primary winding applied voltage, as is indicated by the vectors $E'_{153}$ and $E'_{154}$ in Fig. 3. For example, upon increase in the applied frequency from the value to which the secondary winding is resonant, the phase displacement between the voltage appearing across the secondary winding section 154 and the applied primary voltage decreases toward zero, while the phase displacement between the voltage appearing across the secondary winding section 153 and the primary voltage increases toward 180°. Upon decrease in the applied frequency the converse is true. That is to say, the phase displacement between the vectors $E_{126}$ and $E_{154}$ in Fig. 3 increases toward 180° while the displacement between the vectors $E_{126}$ and $E_{153}$ decreases toward zero. In other words, when the applied frequency deviates from the value to which the primary and secondary windings are resonant, the voltage appearing across one of the secondary winding sections 153 and 154 will be more nearly in phase with the primary voltage while the voltage across the other secondary winding section will be more nearly 180° out of phase with the primary voltage.

When the applied frequency to the primary winding 126 deviates slightly from the value to which the secondary winding is tuned, the resultant voltage applied to one of the diodes 150 or 151 will decrease, as indicated by the vector $E'_{ar}$ while the resultant voltage applied to the other diode will increase as shown by the vector $E_{ar}$. Upon greater deviation in the applied frequency in the same direction from the value to which the secondary winding is resonant, the resultant voltage applied to the second-mentioned diode will increase to a maximum value, and upon still greater frequency deviation, also begin to decrease, as may be seen by reference to Fig. 4 wherein the curve $er$ represents the manner in which the resultant voltage applied to the diode 150 changes upon variation in the applied frequency and the curve $e'r$ represents the manner in which the resultant voltage applied to the diode 151 simultaneously changes.

Figure 4:
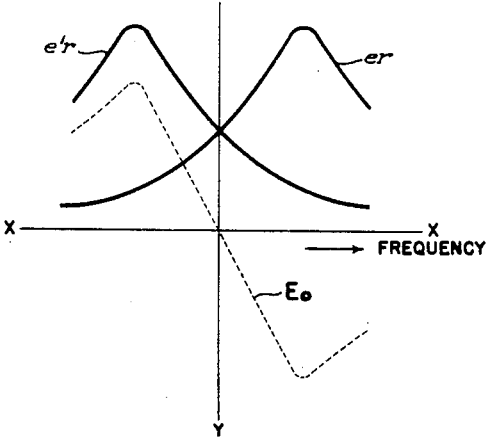

As illustrated in Fig. 4, the resultant voltage $er$ applied to the diode 150 increases initially, as the applied frequency increases from the value to which the secondary winding is resonant, until a maximum value is attained following which it again decreases as the applied frequency is changed further in the same direction. Concurrently, the resultant voltage applied to the other diode 151 will decrease and continue to decrease gradually as the applied frequency further deviates from the resonant value. As a result of this action, the voltage drop produced across the resistance 157 is increased, while that across the resistance 158 is decreased.

Upon deviation in the applied frequency to the primary winding 126 in the opposite direction from the value at which the secondary winding is resonant, the resultant voltage applied to the diode 150 will decrease while the resultant voltage contemporaneously applied to the diode 151 will increase to a maximum value, following the attainment of which it will also begin to decrease. As a result of this action, the voltage drop produced across the resistance 158 will be increased while that produced across resistance 157 will be decreased.

The manner in which the voltage drops across the resistances 157 and 158 change with variation in the applied frequency is illustrated in Fig. 4 by curve $E_0$. At the point of intersection of the curve $E_0$ with the $x$—$x$ axis the voltage drops across the resistances 157 and 158 are equal. The portion of the curve $E_0$ to the right of the $y$—$y$ axis represents the difference in voltage drops across the resistances 157 and 158, the voltage drop across the resistance 157 being the greater, occurring upon an increase in the applied frequency. The portion of curve $E_0$ to the left of the $y$—$y$ axis represents the difference in magnitudes of the voltage drops across the resistances 157 and 158, that across the resistance 158 being the greater and occurring upon a decrease in the applied frequency.

Since the high frequency signal currents applied to the primary winding 126 of the discriminator 10 are modulated at the relatively low frequency of the voltage supplied by the supply lines L' and L'', the voltage drops which are produced across the resistances 157 and 158 will be correspondingly modulated at that low frequency. In other words, when the high frequency current output of the limiter 9 is substantially 100% modulated, the voltage drops across resistances 157 and 158 will be produced thereacross only during the regularly recurring intervals when high frequency currents flow from the output circuit of the limiter 9 to the discriminator 10. During the intervals when no high frequency currents flow from the limiter 9 to the discriminator 10, no voltage difference is created across either of the resistances 157 and 158. Accordingly, there are two conditions in which the resultant of the voltages across resistances 157 and 158 and impressed across the output terminals 169 and 170 of the discriminator 10 is zero. The first condition is that existing when no high frequency currents are applied to the primary winding 126. The second condition is that occurring when the frequency of the high frequency currents applied to the primary winding 126 is the value to which the secondary winding of the discriminator is tuned.

In the arrangement disclosed, high frequency currents are applied to the discriminator 10 only during alternate half cycles of the alternating voltage derived from the supply lines L' and L''. Consequently, when the frequency of the high frequency currents applied to the discriminator 10 is the value, 4.3 megacycles, to which the secondary winding is tuned, no voltage drop is created between the discriminator output terminals 169 and 170 during the half cycles, hereafter termed the operative half cycles, when high frequency currents flow from the limiter 9 to the discriminator 10. During the other half cycles of the alternating supply voltage, no high frequency currents are applied to the discriminator primary winding 126 and in this case also no voltage drop appears between the discriminator output terminals 169 and 170. As a consequence, when the frequency of the high frequency currents supplied to the primary winding 126 corresponds to the value to which the discriminator 10 is tuned, the potential of the terminal 169 is the same as that of the terminal 170.

Figure 5:
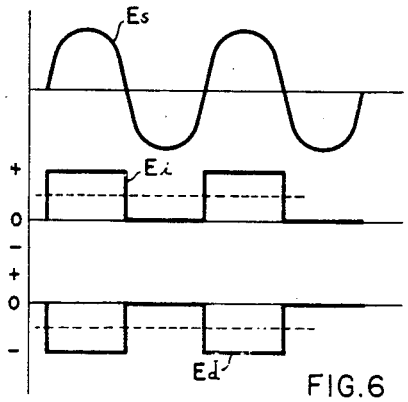

When the frequency of the high frequency currents applied to the discriminator primary winding 126 increases above 4.3 megacycles per second, the value to which the discriminator 10 is resonant, a resultant potential drop of the polarity rendering the terminal 169 positive with respect to the terminal 170 is created across the resistances 157 and 158 during the operative half cycles of the alternating voltage supplied by the supply lines L' and L''. During the other half cycles no high frequency currents are supplied to the discriminator 10, and therefore, the potentials at the terminals 169 and 170 will be identical. As a result, an undulating or pulsating voltage is created between the terminals 169 and 170 upon increase in the frequency of oscillation of the high frequency currents applied to the discriminator 10. This fluctuating voltage will be of one phase or of opposite phase with respect to the voltage of the supply lines L' and L'', and for purposes of explanation, may be assumed to be in phase with the voltage of the supply lines L' and L'', as indicated in Fig. 5, wherein the curve $E_s$ represents the supply line voltage and the curve $E_1$ represents the output voltage of the discriminator 10 appearing between the terminals 169 and 170 upon an increase in the applied frequency to the discriminator.

Upon decrease in the frequency of oscillation of the high frequency currents applied to the discriminator 10, an undulating or pulsating voltage of opposite phase is produced between the terminals 169 and 170. This result is brought about by virtue of the fact that during the operative half cycles of the voltage of the supply lines L' and L'', the voltage drop across the resistance 158 will be greater than that across the resistance 157, thus rendering the potential of the terminal 170 positive with respect to that of the terminal 169. During the other half cycles no high frequency currents are impressed on the discriminator 10, and consequently, the potentials of the terminals 169 and 170 are identical. Accordingly, an undulating or pulsating voltage is produced between the terminals 169 and 170 which is 180° out of phase with the voltage of the supply lines L' and L''. This voltage output is represented by the curve $E_d$ in Fig. 5.

From the foregoing explanation it will be clear that the potentials at the discriminator output terminals 169 and 170 are identical when the frequency of oscillation of the high frequency currents applied to the discriminator 10 is the value to which the discriminator is resonant, and that upon deviation in the frequency of the applied high frequency to the discriminator in one direction or the other from the resonant value, a pulsating voltage of one phase or of opposite phase with respect to the voltage of the supply lines L' and L'' is created between the terminals 169 and 170. It will be clear also that the amplitude of fluctuation of the undulating voltage so produced between the terminals 169 and 170 is dependent upon the extent of deviation of the applied frequency from the value to which the discriminator is tuned, as will be apparent upon reference to the $E_0$ in Fig. 4. Inasmuch as the high frequency signal currents generated by the oscillator 4 and transmitted to the receiver 6 are keyed by the keyer 13 with a square wave form at the frequency of the voltage supplied by the lines L' and L'', the undulating voltage produced between the terminals 169 and 170 is substantially a square wave form.

Those skilled in the art will recognize that the invention in its practical application is not restricted to the use of a frequency discriminator 10 of the type disclosed and that other types, particularly those conventionally employed for automatic frequency control and frequency modulation detection in radio broadcast receivers may be employed equally as well.

For the purpose of generating a second undulating or pulsating voltage opposite in phase but of the same frequency and of substantially the same wave form as that created between the discriminator output terminals 169 and 170, there is also provided in the receiver 6, the oscillator 7, the buffer 11 arranged to be keyed by the keyer 13, and the balanced discriminator 12 to which reference has previously been made.

The oscillator 7 may be and has been shown as being identical to the oscillator 4 and includes a pentode tube 171 which may be of the commercially available type 6SJ7. The tube 171 includes an anode 172, a suppressor grid 173, a screen grid 174, a control grid 175, a cathode 176 and a heater filament 177. The heater filament 177 is connected to and receives energizing current from the transformer secondary winding 97.

Anode voltage is supplied to the oscillator 7 from the voltage divider resistance 104 through a circuit which may be traced from the potential point $a$ on the divider 104 through resistances 178 and 179 to the anode 172, the cathode 176 and the inductance coil 180 to the grounded potential point $e$ on the divider 104. A condenser 181 connected between ground G and the point of engagement of resistances 178 and 179 is employed to provide additional filtering of the voltage applied to the anode 172. The suppressor grid 173 is directly connected to ground G.

Screen grid voltage is supplied to the oscillator tube 171 from the divider resistance 104 through a circuit which may be traced from the point $a$ through a resistance 182 to the screen grid 174, the cathode 176 and the inductance coil 180 to the grounded potential point $e$.

The control grid 175 is connected through a resistance 183 to ground G and through a condenser 184 to one terminal of a parallel circuit, the other terminal of which is connected to ground, including the retuning means or variable condenser 17 in one branch and an inductance coil 185 in the second branch. The inductance coil 185 is inductively coupled to the inductance coil 180. If desired a trimming condenser, not shown, may be connected in parallel with the condenser 17 and the inductance coil 185 for providing a fine adjustment of the zero setting of the instrument pen and pointer.

The oscillating circuit of the oscillator 7 includes the control grid circuit of which the parallel circuit including the retuning means 17 forms a part and also includes the screen grid circuit. These circuits are inductively coupled by the inductance coils 180 and 185 and provide for high frequency operation over a range of frequencies in the region of 4.3 megacycles per second. The anode 172 of the oscillator pentode tube 171 is electron coupled to the screen grid 174 so that the high frequency oscillating currents flowing through the screen grid circuit may cause the voltage of the anode 172 to oscillate at the same high frequency. The screen grid 174 is connected to ground through a condenser 174'.

As shown, the anode or output circuit of the oscillator 7 is coupled by means of a condenser 186 to the input or control grid circuit of the buffer 11. The buffer 11 comprises a pentode tube 187 of the type 6SJ7 including an anode 188, a suppressor grid 189, a screen grid 190, a control grid 191, a cathode 192 and a heater filament 193. The heater filament 193 is connected to and receives energizing current from the transformer secondary winding 97.

Anode voltage is supplied to the tube 187 from the voltage divider resistance 104 through a circuit which may be traced from the point $b$ on the divider resistance through a resistance 194, the primary winding 195 of the frequency discriminator 12, the anode 188, cathode 192 and a parallel connected resistance 196 and condenser 197 to the grounded potential point e on the divider resistance. The transformer primary winding 195 is shunted by a condenser 198.

Screen grid voltage is supplied the tube 187 from a portion of the voltage divider 104 which is shunted by a resistance 199 which, as shown, is connected between the potential points b and e on the divider. A contact 200 slidable along the resistance 199 is provided for the adjustment of the voltage impressed on the screen grid 190, and is connected to ground through a condenser 200'. The screen grid circuit may be traced from the contact 200 through an inductance or choke coil 201 to the screen grid 190, the cathode 192, and the parallel connected resistance 196 and condenser 197 to the grounded potential point e. The suppressor grid 189 is connected directly to the cathode 192. The screen grid 190 is connected to ground through a condenser 190'.

The control grid 191 is connected by a resistance 202a to ground G and is also connected through the condenser 186 to the anode 172 of the oscillator tube 171.

For the purpose of amplitude modulating the high frequency current output from the buffer 11 at the relatively low frequency of the voltage supplied by the supply lines L' and L'', a second circuit including the keyer tube 13 is provided for applying an undulating voltage of that relatively low frequency to the screen grid 190. This second circuit may be traced from the screen grid 190 of the buffer tube 187 through the choke coil 201 to the anode 130 of the keyer tube 13, the cathode 134, the biasing resistance 136, condenser 144 to ground G, and through the parallel connected resistance 196 and condenser 197 to the cathode 192 of the buffer tube 187. As previously explained, the potential of the anode 130 of the keyer 13 undulates or fluctuates with a square wave characteristic at the relatively low frequency of the voltage of the supply lines L' and L'', and accordingly, causes the potential of the screen grid 190 of the buffer tube 187 to correspondingly undulate or flutuate. Consequently, the high frequency current output of the buffer stage 11 is amplitude modulated at the relatively low frequency of the supply lines L' and L''. Since the high frequency current output of the buffer stage is amplitude modulated by the keyer tube 13 which is also employed to amplitude modulate the high frequency current output of the limiter 9, the wave form of the modulation envelope of the output current from the buffer 11 will be substantially identical to the modulation envelope of the output current from the limiter 9.

The modulated high frequency currents flowing from the output circuit of the buffer 11 are impressed on the frequency discriminator 12 which may be identical in operation and in construction to the frequency discriminator 10. Specifically, the frequency discriminator 12 includes a transformer 202 and a pair of diode rectifiers 203 and 204 which may be contained within a single envelope generally designated at 205. The transformer 202 includes the primary winding 195 and a split secondary winding, one section of which has been designated by the reference numeral 206 and the other by the reference numeral 207. The center tap of the split secondary winding comprising the point of connection of the adjacent ends of the winding sections 206 and 207 is connected through a blocking condenser 208 to the anode 188 of the buffer 11 and is also connected to the upper terminal of the transformer primary winding 195. The center tap of the split secondary winding is also connected through a choke coil or inductance 209 to the point of engagement of a pair of resistances 210 and 211. The usable output voltage of the discriminator 12 is obtained across the resistances 210 and 211 and appears between the output terminals designated at 212 and 213. As shown, the resistance 210 is shunted by a condenser 214 and the resistance 211 is shunted by a condenser 215.

The diode rectifiers 203 and 204 may be contained within a single tube such as the commercially available type 6H6, and each include anode, cathode and heater filament elements which have been designated by the respective reference numbers 216, 217 and 218 in the diode 203 and by the respective reference numbers 219, 220 and 221 in the diode 204. Both of the heater filaments 218 and 221 are connected to and receive energizing current from the transformer secondary winding 97. The cathode 217 of the diode 203 is connected through the resistance 210 and the inductance 209 to the center tap on the split secondary winding, and the cathode 220 is also so connected through the resistance 211 and the inductance 209. Anode 216 is connected to the end terminal of the split secondary winding section 206 and the anode 219 is connected to the end terminal of the winding section 207. A condenser 222 is provided in parallel to the split secondary winding for tuning the latter to the same frequency as that to which the split secondary winding of the discriminator 10 is tuned. The blocking condenser 208 and the condensers 214 and 215 are so selected as to present low impedance to the high frequency oscillating currents flowing through them. The condenser 198 and the transformer secondary winding 195 are so selected as to provide high impedance in order to create a large output signal voltage from the discriminator. Preferably the condenser 198 is so chosen as to tune the primary winding 195 to the same frequency as that to which the split secondary winding is tuned.

The operation of the frequency discriminator 12, as previously noted, is the same as that of the frequency discriminator 10. Thus, when the frequency of the modulated high frequency currents impressed on the input circuit of the frequency discriminator 12 is the value to which the frequency discriminator is tuned no output voltage appears across the discriminator output terminals 212 and 213. Upon deviation of the applied frequency in one direction from that frequency value, however, an undulating voltage having the same frequency as the voltage of the supply lines L' and L'' and of one phase with respect to the voltage of the supply lines L' and L'' will appear between the output terminals 212 and 213, while upon deviation of the applied frequency in the opposite direction an undulating voltage of the same frequency but of opposite phase will appear between those output terminals.

In order to create an undulating or pulsating voltage which may be employed to control the selective energization of the reversible electrical motor 16 for rotation in one direction or the other whenever the output signal voltages of the discriminators 10 and 12 are of unequal amplitude, the mixing amplifier 14 comprising two parallel connected amplifier triode sections 223 and 224 is provided. As shown, the undulating output voltage of the discriminator 10 is impressed on the input circuit of the triode 223 while the undulating output voltage of the discriminator 12 is impressed on the input circuit of the triode 224. As will become apparent as the description proceeds, the phase of the output voltage obtained from the mixing amplifier 14 depends on the relative magnitudes of the two input signal voltages and the amplitude of the mixing amplifier output signal voltage depends upon the difference between the amplitudes of the input signal voltages.

The triodes 223 and 224 may be contained within a single envelope and for example may each comprise one half of a commercially available type 7F7 tube. The section 223 includes an anode 225, a control grid 226, a cathode 227, and a heater filament 228, while the section 224 includes an anode 229, a control grid 230, a cathode 231 and a heater filament 232. Energizing current is supplied to each of the heater filaments 228 and 232 from the transformer secondary winding 97.

The anode circuits of the tube sections 222 and 223, as shown, are connected in parallel and are supplied with voltage from the voltage divider resistance 104 through a circuit which may be traced from the potential point $a$ through a resistance 233 to the anodes 225 and 229, and the cathodes 227 and 231 to the grounded potential point $e$ on the voltage divider. The control grid 226 of the tube section 223 is connected to the output terminal 169 of the frequency discriminator 10 and the output terminal 170 thereof is connected to the cathode 227. The control grid 230 of the tube section 224 is connected to the output terminal 212 of the frequency discriminator 12 while the output terminal 213 is connected to the cathode 231. Therefore, the output voltage of the frequency discriminator 10 is impressed on the control grid or input circuit of the tube section 223 while the output voltage of the frequency discriminator 12 is impressed on the control grid or input circuit of the tube section 224.

When the apparatus disclosed is in its balanced or stabilized condition the undulating signal voltage impressed on the input circuit of the tube section 223 from the frequency discriminator 10 is of the same amplitude and wave form but is opposite in phase to the undulating voltage impressed on the input circuit of the tube section 224 from the frequency discriminator 12. As those skilled in the art will understand, with such undulating signal voltages impressed on the input circuits of the mixing amplifier 14 a substantially steady unidirectional voltage drop will be produced across the common load resistance 233. This steady voltage is ineffective to cause rotation of the reversible motor 16. Upon deviation in the amplitude of the undulating voltage impressed on the input circuit of the tube section 223 from the frequency discriminator 10 from the balanced value, an undulating voltage of the same frequency as that of the voltage of supply lines L' and L" and of one phase or of opposite phase depending upon the direction of deviation will be produced across the load resistance 233 in the output circuit of the mixing amplifier 14 and will be impressed on the input circuit of the power amplifier 15. When said undulating voltage is of one phase relatively to the voltage of the supply lines L' and L", the motor 16 will be actuated for rotation in one direction while it will be actuated for rotation in the opposite direction when the said undulating voltage is of opposite phase.

In the arrangement disclosed, the received and the locally generated high frequency signal currents are keyed in phase by the keyer 13. For identical and symmetrical frequency discriminators 10 and 12 tuned to the same frequency, balance is reached in the contemplated operation of the arrangement shown when one oscillator frequency is higher than the discriminator balanced frequency by the same amount that the other oscillator frequency is lower.

If it is desired that both oscillators have the same frequency of oscillation at the balanced condition, the two high frequency signal currents may be keyed 180° out of phase. Such operation can be readily accomplished by providing individual keyers for the limiter 9 and for the buffer 11 and by impressing a 60 cycle per second alternating voltage on the control grid of one keyer displaced 180° in phase with respect to that impressed on the control grid of the other keyer. Alternatively, the two high frequency signal currents may be keyed in phase, as in the arrangement of Fig. 2 disclosed, and the undulating output voltage of the frequency discriminator 12 may be reversed, rendering it 180° out of phase with the undulating output voltage of discriminator 10, by reversing the cathode connections of the diodes 203 and 204 to the resistances 210 and 211, that is by connecting cathode 217 to the lower end of resistance 211 and by connecting cathode 220 to the upper end of resistance 210.

The power amplifier 15 comprises a twin triode tube such as the type 7N7 tube. One triode includes an anode 235, a control grid 236, a cathode 237 and a heater filament 238, while the other triode includes an anode 239, a control grid 240, a cathode 241, and a heater filament 242. The heater filaments 238 and 242 are connected to, and receive energizing voltage from, the winding 140 of the transformer 138. The control grids 236 and 240 are directly connected to each other and to a contact 243 in engagement with and adjustable along the length of a resistance 244, which, in turn, is connected in series with the condenser 234 from the anodes 225 and 229 of the mixing amplifier 14 to ground G. The condenser 234 is provided for impressing the fluctuating or undulating components of voltage produced across the resistance 233 on the input circuit of the power amplifier 15 while preventing the direct current component of the current flow through the anode circuits of the mixing amplifier 14 from being impressed on said input circuit. The output voltage from the mixing amplifier 14, therefore, is impressed simultaneously and equally on both of the power amplifier control grids 236 and 240. The adjustable resistance 244 is provided to facilitate adjustment in the gain of the power amplifier 15.

Anode voltage is supplied to the triodes of the power amplifier 15 from the split secondary winding 141 on the transformer 138. To this end anode 235 is connected to the left end terminal of the winding 141 while the anode 239 is connected to the right end terminal of that winding. The cathodes 237 and 241 are connected together and through a biasing resistance 245 to ground G. The center tap on the split secondary winding 141 is connected through the control winding 34 of the motor 16 to ground G and through the biasing resistance 245 to the cathodes 237 and 241.

As is illustrated in Fig. 1, the reversible motor 16 is provided with a stator 31 having four pole pieces which are physically spaced apart by 90° and also includes a squirrel cage rotor 32 having interconnected conductor bars. It will be evident that more than four pole pieces may be provided on the motor 16, if desired. For example, in a commercially available embodiment of the motor illustrated, the stator 31 is provided with eight pole pieces. The power winding 33 is wrapped around two of the opposite pole pieces of the stator 31 and the control winding 34 is wrapped around the remaining two opposite pole pieces. When only the power winding 33 is energized, the rotor 32 is not urged to rotation in either direction and remains stationary. When the control winding 34 is energized and the voltage and current through it lead the voltage and current, respectively, in the power winding 33, the rotor 32 is actuated for rotation in one direction, for example, in a clockwise direction. When the voltage and current in the control winding 34 lag the voltage and current, respectively, in the power winding 33, the rotor 32 rotates in the opposite direction.

The motor 16 is preferably so constructed that the control winding 34 and parallel connected condenser 247 has a high impedance to match the impedance of the anode circuits of the power amplifier 15 when the rotor 32 is rotating at full speed. By providing a power winding 33 having a high impedance, increased efficiency of operation is obtained. Preferably, the control and power windings of the motor have a high ratio of inductive reactance to resistance, for example from 6 to 1 to 8 to 1, at the frequency of the alternating current supplied by the lines L' and L'', namely 60 cycles per second. This provides for maximum power during running with the least amount of heating, and also provides a low impedance path in the control windings for anti-hunting control purposes. By so designing the motor, reduction in heating thereof during its stalled condition is also obtained.

Energizing current is supplied to the power winding 33 of the motor through a circuit which may be traced from the alternating current supply line L', through the power winding 33 and a condenser 246 to the supply line L''. The condenser 246 is so chosen with respect to the inductance of the power winding 33 as to provide a substantially series resonant circuit when the rotor 32 is rotating at approximately full speed. By virtue of this series resonant circuit the total impedance of the power winding circuit is substantially equal to the resistance of the power winding 33. Inasmuch as this resistance is relatively low, a large current flow through the power winding is made possible resulting in the production of maximum power and torque by the motor. Due to the series resonant circuit also the current flow through the power winding 33 is substantially in phase with the supply line voltage. The voltage across the power winding 33, however, leads the current flow by substantially 90° because of the inductance of the power winding.

When the rotor 32 is operating at substantially maximum speed, the apparent inductance of the power winding 33 is a maximum whereupon the series resonant circuit is resonant to the applied alternating current from the supply lines L' and L''. As the speed of rotation of the rotor 32 decreases the apparent inductance of the power winding 33 decreases and therefore disturbs to some degree the resonant condition. This causes a slight phase shift in the current through and the voltage across the power winding, the voltage shifting somewhat more than the current and consequently reducing the power loss in the power winding. In addition, the change from the resonant condition causes a reduction in the current flow through the power winding, and because of the decrease in apparent inductance, the voltage across the power winding also decreases. This produces further reduction of power loss in the power windings. As a result there is a substantial reduction of heating of the power windings when the rotor 32 is at rest.

Power is supplied to the control winding 34 from the split secondary winding 141 of the transformer 138 through the anode circuits of the twin triodes of the power amplifier 15 through the circuits previously traced. A condenser 247 is connected in parallel with the control winding 34 and is so selected as to provide a parallel resonant circuit during both the stalled and running conditions of the motor. This parallel resonant circuit presents a relatively high external impedance and a relatively low internal impedance. The relatively high external impedance of the parallel resonant circuit matches the impedance of the anode circuit of the power amplifier triodes and, therefore, provides for optimum conditions of operation. The relatively low internal circuit impedance of the control winding 34 and the condenser 247 approximates the actual resistance of the control winding 34, and since this is relatively low, the impedance of the internal circuit is also relatively low, making possible a large current flow through the control winding.

The sections of the split transformer secondary winding 141 are so wound on the transformer 138 that the anode 235 of the triode of the power amplifier 15 is driven positive during one half cycle of the alternating current supply voltage. For convenience of explanation, this half cycle is hereinafter referred to as the first half cycle. The anode 239 of the other triode is driven positive during the opposite or second half cycle and, therefore, during the first half cycle when the anode 235 is positive with respect to the center tap on the split secondary winding 141, the anode 239 is negative with respect to the potential of that center tap. During the second half cycle the anode 239 becomes positive with respect to the center tap of the secondary winding 141 while the anode 235 becomes negative with respect to the potential of the center tap. The voltage on the anode 235 accordingly increases and decreases in phase with the supply line voltage and the voltage on the anode 239 increases and decreases 180° out of phase with the supply line voltage. This relation always remains substantially the same.

The details of the motor drive system including the amplifier 15 comprise no part of the present invention, and therefore, further explanation of the operation of the motor drive system is not believed necessary herein, particularly since the motor drive system is fully described in the copending application of Walter P. Wills, Serial No. 421,173, filed on December 1, 1941, and is also explained in my copending application referred to hereinbefore.

When the rate of fluid flow through the conduit 1 remains constant at the desired value, the frequency of oscillation of the high frequency current output from the oscillator 4 is higher than the frequency value to which the discriminator 10 is resonant by substantially the same amount that the frequency of oscillation of the high frequency current output of the oscillator 7 is lower than the frequency value to which the discriminator 12 is tuned. The undulating voltage then impressed on the input circuit of the triode section 223 of the mixing amplifier 14 from the discriminator 10 is of the same amplitude but exactly 180° out of phase with the undulating voltage impressed on the triode section 224 of the mixing amplifier from the discriminator 12. With such input voltages of the same amplitude impressed on the triode sections of the mixing amplifier 14, the voltage drop produced across the common load resistance 233 in the output circuit of the mixing amplifier 14 is a steady unidirectional voltage and does not include any alternating components capable of energizing the motor 16 to rotation, and as a consequence, the motor remains stationary.

Upon an increase in the rate of fluid flow through the conduit 1 the manometer 2 operates the detuning condenser 3 to give an adjustment of the condenser plate 29 in the clockwise direction to decrease its capacity. This produces an increase in the frequency of oscillation of the oscillator 4 which is operative to cause an increase in the undulating voltage produced at the output terminals 169 and 170 of the discriminator 10 whereupon the amplitude of the undulating voltage impressed on the input circuit of the triode section 223 of the mixing amplifier 14 is increased with respect to the amplitude of the undulating voltage impressed on the triode section 224. A fluctuating component of voltage having the same frequency as that of the voltage of the supply lines L' and L'' is then produced at the output terminals of the mixing amplifier 14 and is impressed on the input circuit of the power amplifier 15 for selectively actuating the motor 16 for rotation in one direction. The motor 16 then operates the retuning condenser 17 in the proper direction to effect a decrease in the frequency of oscillation of the high frequency current output from the oscillator 7 by an amount corresponding to the increase in the frequency of oscillation of the high frequency currents applied to the discriminator 10 as required to equalize the amplitude of the undulating voltage applied to the input circuit of the triode section 224 of the mixing amplifier 14, with the undulating voltage impressed on the triode section 223.

Upon a decrease in the rate of fluid flow through the conduit 1, the manometer 2 operates the detuning condenser 3 in the opposite direction to give an adjustment to the condenser plate 29 in the counter-clockwise direction to increase its capacity. This produces a decrease in the frequency of oscillation of the oscillator 4 and, therefore, a decrease in the amplitude of the undulating voltage created at the output terminals of the discriminator 10 and impressed on the input circuit of the triode section 223 of the mixing amplifier 14. The motor 16 is then energized for rotation in the opposite direction to effect an adjustment of the retuning condenser 17 in the reverse direction to cause the amplitude of undulation of the output voltage of the discriminator 12 to decrease by an amount corresponding to the decrease in the amplitude of the undulation of the output voltage of the discriminator 10. When such adjustment has been given the condenser 17, the motor 16 is not energized for rotation in either direction and remains stationary. The motor 16, therefore, operates in one direction or the other accordingly as the frequency of oscillation of the oscillator 4 increases or decreases from the value to which the system is balanced with the particular adjustment of the retuning condenser 17. Moreover, the speed of the motor 16 in either direction is directly dependent, within a predetermined range, upon the magnitude of the change in the frequency of oscillation of the oscillator 4.

The rotation of the motor 16 operates through a gear 36, the cable drum 39, cable 40 and cable drum 44 to adjust the retuning condenser 17 and also operates to adjust the position of the recording pen 53 and the indicating pointer, not shown, relatively to the chart 54. In other words, the indicating pointer, not shown, operated by the shaft 37 from the gear 36 and pen arm 53 operated through the gear sector 51 by the gear 36 assume angular positions corresponding to the angular adjustment of the detuning means 3, the differential pressure in the manometer 2, and the rate of flow through the conduit 1 for indicating and recording the rate of flow through the latter. The indicating scale cooperating with the indicating pointer, not shown, and the slowly rotating chart 54 cooperating with the pen arm 53 may be suitably calibrated for indicating the rate of flow through the conduit 1.

If the characteristics of the retuning condenser 17 correspond to the characteristics of the detuning condenser 3, the indicating scale and chart may be calibrated in accordance with those characteristics or in accordance with the characteristics of the manometer 2. Uniform or even graduations on the chart and indicating scale, therefore, would indicate the differential pressure existing within the manometer 2, and in order to indicate and record the rate of flow through the conduit 1, the chart and scale must have square root calibration. If it is desired to have a straight line calibration on the chart and scale for indicating the rate of fluid flow through the conduit 1, the retuning means 17 may be so designed as to eliminate the square root function, as by suitable configuration of the condenser plates 48 and 49 with respect to each other.

Because the gear sector 51 operated by the gear 36 is positioned in accordance with the rate of fluid flow through the conduit 1 or other variable condition under measurement, the control apparatus 18a is operative to position the control valve 19 for maintaining the desired rate of flow through the conduit 1 or for maintaining constant some other variable condition.

As those skilled in the art will understand, my present invention in its practical application is not restricted to the use of a variable condenser 3 for detuning the oscillator 4 in response to a change in the fluid rate of flow through the conduit 1 or in the particular variable condition under measurement, and also is not restricted to the use of a variable condenser 17 for retuning the oscillator 7. For example, the detuning adjustments of the oscillator 4 may be effected solely by means of variable inductive reactance elements, or by a combination of capacitive and inductive reactance elements. Similarly, the retuning adjustments of the oscillator 7 may be effected solely by means of variable inductive reactance elements or by a combination of capacitive and inductive reactance elements as disclosed in my aforementioned copending application. When inductive reactance elements are employed for accomplishing the detuning and retuning adjustments of the oscillators, it may be desirable in some cases to provide inductive reactance elements of the type having high frequency coils in order to produce a relatively large change in frequency of oscillation for a small movement of the primary sensitive element.

Figure 6:
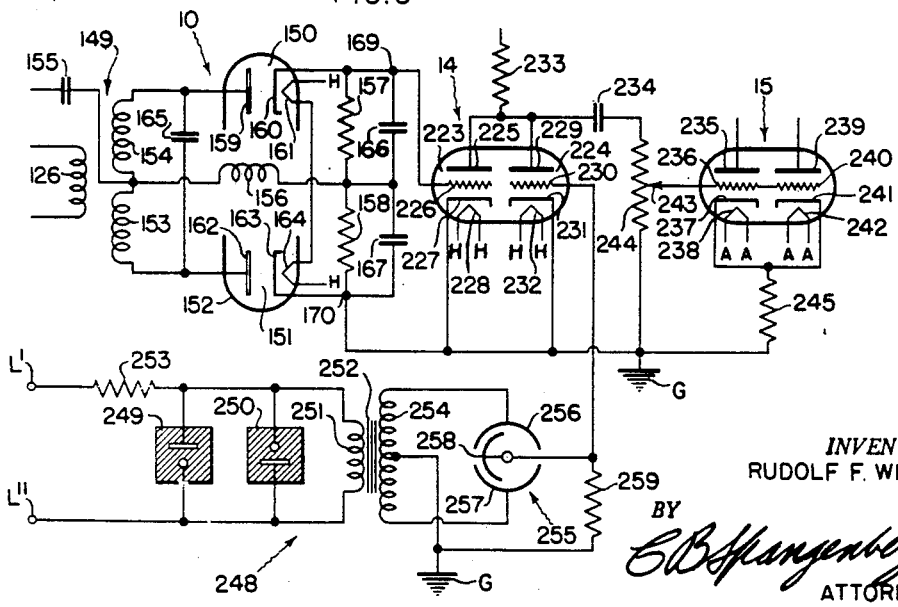
Fig. 6 is a wiring diagram illustrating a modification of a portion of the arrangement of Fig. 2.

In Fig. 6 I have illustrated more or less diagrammatically a modification of the receiver circuit 6 which includes an alternative circuit arrangement which may be employed in lieu of the oscillator 7, buffer 11 and discriminator 12 for producing a 60 cycle per second undulating voltage opposite in phase to that created at the output terminals of the frequency discriminator 10, and which may be utilized to control the triode section 224 of the mixing amplifier 14. The arrangement of Fig. 6 is advantageous in that it permits the oscillator 7, the buffer 11 and the frequency discriminator 12 to be entirely dispensed with and requires the use of only a comparatively few components in place thereof.

As shown in Fig. 6 the undulating voltage for controlling the triode section 224 is created by a signal generator indicated generally by reference character 248. Signal generator 248 operates to derive directly from the alternating voltage of the supply lines L' and L'' a 60 cycle per second signal voltage of variable magnitude and of reversible phase. Since the output signal voltage of the frequency discriminator 10 comprises a substantially symmetrical square wave of 60 cycles per second, the signal generator 248 is also so designed as to derive such a square wave voltage signal from the supply lines L' and L'', which supply lines ordinarily provide sinusoidal voltage. To this end the signal generator 248 includes two gaseous discharge tubes 249 and 250 which are connected back-to-back across the primary winding 251 of a transformer 252 and are also connected in series with a protective resistance 253 across the supply lines L' and L''. The transformer 252 also includes a center tapped secondary winding 254 across which a differential condenser indicated generally by the reference numeral 255 is connected. The differential condenser 255 includes a pair of oppositely disposed and relatively stationary arcuate condenser plates 256 and 257 and a movable arcuate condenser plate 258. The center tap of the transformer secondary winding 254 is connected to ground G and the movable condenser plate or rotor 258 of the differential condenser 255 is grounded by means of a resistance 259. Depending upon the position of the movable condenser plate 258 with respect to the relatively stationary plates 256 and 257, a 60 cycle per second signal voltage of variable magnitude and reversible phase is produced across the resistance 259. This signal voltage produced across the resistance 259 is applied to the input circuit of the triode section 224 of the mixing amplifier 14 and the rotor or movable condenser plate 258 is mechanically coupled to the shaft of the motor 16 for rebalancing purposes, the differential condenser 255 in this modification taking the place of the oscillator condenser 17 in Fig. 2 as the retuning or follow-up condenser. The manner in which the movable condenser plate 258 is mechanically coupled to the shaft of the motor 16 may be the same as that in which the retuning condenser 17 is mechanically coupled to the shaft of motor 16 in Figs. 1 and 2.

It will be apparent that the detuning condenser 3 or the retuning differential condenser 255 may be so designed and matched that the indication produced by the pen 53 or the indicating pointer, not shown, may be made to follow any desired function of the variation of the detuning condenser 3. It will be understood also that the retuning means for the modification illustrated in Fig. 6 need not necessarily comprise a differential condenser as shown at 255, but if desired, said retuning means may comprise a variable differential inductance or a variable differential resistance as shown in Fig. 7.

Figure 7:
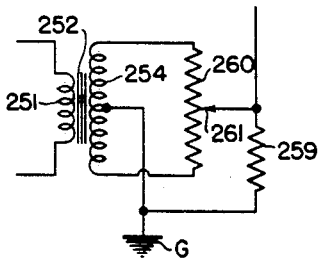
Fig. 7 illustrates a modification of the arrangement of Fig. 6.

In Fig. 7 a potentiometer resistance 260 provided with a contact 261 in slidable engagement with the resistance 260 is connected across the terminals of the tapped transformer secondary winding 254. When the contact 261 is in an intermediate position along the length of resistance 260 no potential difference is developed across the resistance 259, but upon movement of the contact 261 in one direction away from that intermediate position an alternating voltage having a square wave characteristic and of one phase relatively to the voltage of the supply lines L' and L'' is produced across the resistance 259 while upon movement of the contact 261 in the opposite direction, a square wave alternating voltage of opposite phase is produced across the resistance 259. With this modification of my invention the indication produced by the pen 53 or the indicating pointer, not shown, may be made to follow any desired function of the variation of the detuning condenser 3 by suitably shaping and designing the resistance 260.

As those skilled in the art will understand, it is not essential to the operation of the measuring and controlling systems described in Figs. 1 through 7 that the frequency discriminator 10 and the discriminator 12, when employed, be of the so-called balanced type. For example, the frequency discriminators 10 and 12 may be of the non-balanced type as disclosed in Fig. 8 and indicated generally by the reference symbols 10' and 12'. The use of such a discriminator is advantageous in that it makes possible an appreciable reduction in the amount of equipment involved. In each of the non-balanced frequency discriminators 10' and 12' shown in Fig. 8 only one rectifier is employed. These rectifiers designated by the reference numerals 262 and 263, each include an anode, a cathode and a heater filament. The heater filaments are connected to and receive energizing current from the transformer secondary winding 97.

The remainder of the frequency discriminator 10' comprises a transformer 149' having a primary winding 264 shunted by a condenser 265 and secondary winding 266 shunted by a condenser 267, and also includes a resistance 268 shunted by a condenser 269. The rectifier 262 is connected in a series circuit with the transformer secondary winding 266 and the parallel connected resistance 268 and condenser 269 through a circuit which may be traced from the upper terminal of the secondary winding 266 to the anode of the rectifier, to the cathode, the resistance 268 and ground G to the lower terminal of the secondary winding 266. The condensers 265, 267 and 269 are so chosen as to tune the frequency discriminator 10' to a desired frequency near or in the region of the frequency of the high frequency currents generated by the oscillator 4. This frequency value to which the discriminator 10' is tuned has been indicated in Fig. 9 by the symbol $f_0$.

Figure 9:
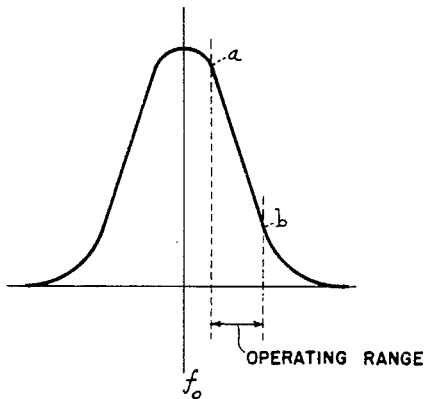
Fig. 9 is a graph illustrating the operation of the modification of Fig. 8.

The graph of Fig. 9 illustrates the resonance curve of the discriminator 10'. This resonance curve is representative of the manner in which the amplitude of the undulating potential drop produced across the resistance 268 and the parallel connected condenser 269 varies as the frequency of the modulated high frequency oscillations applied to the discriminator 10' deviates from the value to which the discriminator is tuned. It is contemplated that the apparatus may be so arranged that the amplitude of the undulating potential drop produced across the resistance 268 may vary between the points a and b along the curve of Fig. 9 as the detuning condenser 3 is adjusted through its entire range of movement. It will be understood that, if desired, the apparatus may be so arranged that the points a and b may fall on the portion of the curve of Fig. 9 to the left of the center frequency fo instead of the right of that frequency, as shown.

The remainder of the frequency discriminator 12' comprises a transformer 270 having a primary winding 271 shunted by a condenser 272 and a secondary winding 273 shunted by a condenser 274, and also includes a resistance 275 shunted by a condenser 276. The rectifier 263 is connected in a series circuit including the transformer secondary winding 273 and the parallel connected resistance 275 and condenser 276. The construction and operation of the frequency discriminator 12' is substantially identical to that of discriminator 10' and creates an undulating voltage of the same frequency as that of the voltage of the supply lines L' and L" as the frequency of the modulated high frequency oscillations applied to the frequency discriminator 12' deviates from the frequency value to which the discriminator 12' is tuned.

The undulating output voltage of the discriminator 10' is applied to the input circuit of the triode section 223 of the mixing amplifier 14 while the undulating output voltage of the discriminator 12' is applied to the input circuit of the triode section 224, the connections being such that the undulating voltage upon the control grid 226 is 180° out of phase with that on the control grid 230. When the amplitudes of the two undulating voltages are the same, a substantially steady current flows through the common load resistance 233 producing a substantially steady potential drop thereacross, while an undulating voltage of one phase or of opposite phase relatively to the voltage of the supply lines L' and L" is produced across resistance 233 when the amplitude of one undulating voltage is greater or less than that of the other.

Figure 8:
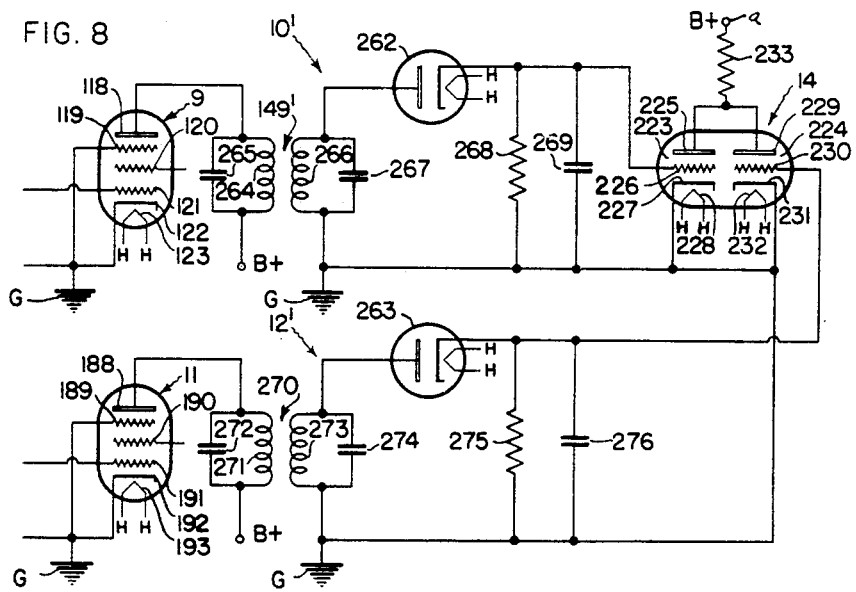
Fig. 8 illustrates a modified form of discriminator which may be employed in the arrangement of Fig. 2.
Figure 10:
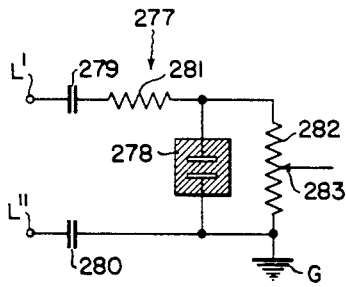
Fig. 10 illustrates a further modification of the arrangements of Figs. 2 and 6.

In Fig. 10 I have illustrated, more or less diagrammatically, a modification of the receiver circuit of Fig. 8 which includes an alternative circuit arrangement which may be employed in lieu of the oscillator 7, buffer 11, and the nonbalanced discriminator 12' for producing a 60 cycle per second undulating voltage opposite in phase to that created at the output terminals of the frequency discriminator 10' and which may be utilized to control the triode section 224 of the mixing amplifier 14. With the arrangement in Fig. 10 the undulating voltage for controlling the triode section 224 is created by a signal generator indicated by the reference symbol 277 and which is operative to derive directly from the alternating voltage supply lines L' and L" a square wave 60 cycle per second signal voltage of variable magnitude but of constant phase. The elements of the tube 278 are connected between the supply lines L' and L" through blocking condensers 279 and 280 and a protective resistance 281, as shown. A potentiometer resistance 282 has its terminals connected to the terminals of the tube 278 and has one terminal connected to ground G. A contact 283 in slidable engagement with the resistance 282 is connected to the control grid of the triode section 224 of the mixing amplifier 14. The contact 283 is arranged to be adjusted along the length of the slidewire resistance 282 by the reversible motor 16, and to this end, the manner of mechanical coupling of the shaft of the motor 16 to the resistance 282 and contact 283 may be the same as that in which the retuning condenser 17 is mechanically coupled to the shaft of motor 16 in Figs. 1 and 2. The operation of the tube 278 is such that a square wave alternating voltage of the same frequency as that of the line wires L' and L" is produced across the resistance 282. That square wave alternating voltage is variable in magnitude depending upon the position of the contact 283 along the length of the resistance 282. Consequently, upon change in amplitude of the square wave alternating voltage produced across the parallel connected resistance 268 and condenser 269 of Fig. 8, the motor 16 is energized for operation in the proper direction to effect a corresponding change in the square wave alternating voltage tapped off the resistance 282 by the contact 283 to thereby restore a steady voltage drop across the load resistance 233 in the output circuit of the mixing amplifier 14, and hence, to rebalance the system.

While in accordance with the provisions of the statutes, I have illustrated and described the best form of this invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent, is:

1. In combination, means to generate an oscillation of relatively high frequency, frequency discriminating means responsive to said high frequency oscillation to produce a voltage of amplitude varying in accordance with the frequency of said oscillation, means to modify the amplitude of said oscillation during predetermined time intervals of a second oscillation of relatively low frequency to produce a resulting voltage of amplitude variable in accordance with the frequency of said oscillation and undulating at said low frequency, means to produce a second voltage of variable amplitude and undulating at said low frequency, and means to compare the amplitudes of said undulating voltages.

2. In combination, means to generate an oscillation of relatively high frequency, frequency discriminating means responsive to said high frequency oscillation to produce a voltage of amplitude varying in accordance with the frequency of said oscillation, means to modify the amplitude of said oscillation during predetermined time intervals of a second oscillation of relatively low frequency to produce a resulting voltage of amplitude variable in accordance with the frequency of said oscillation and undulating at said low frequency, means to produce a second voltage of variable amplitude and undulating at said low frequency, means to produce a fluctuating voltage of said low frequency and of one phase or of opposite phase accordingly as the amplitude of said resulting voltage is greater or less than the amplitude of said second voltage, and phase responsive means controlled by said fluctuating voltage to vary the amplitude of said second voltage to substantially equalize the amplitudes of said resulting and second voltages.

3. In combination, means to generate an oscillation of relatively high frequency, frequency discriminating means responsive to said high frequency oscillation to produce a voltage of amplitude varying in accordance with the frequency of said oscillation, means to modify the amplitude of said oscillation during predetermined time intervals of a second oscillation of relatively low frequency to produce a resulting voltage of amplitude variable in accordance with the frequency of said oscillation and undulating at said low frequency, means to produce a second voltage of variable amplitude and undulating at said low frequency, means to produce a fluctuating voltage of said low frequency and of one phase or of opposite phase accordingly as the amplitude of said resulting voltage is greater or less than the amplitude of said second voltage, and reversible motor means selectively controlled for rotation in one direction or the other by said fluctuating voltage according to its phase to vary the amplitude of said second voltage to substantially equalize the amplitudes of said resulting and second voltages.

4. In combination, first and second oscillators to generate an oscillation of relatively high frequency, first and second frequency discriminators each responsive to an individual one of said high frequency oscillations and each operative to produce an output voltage of amplitude varying in accordance with the frequency of the associated oscillation, means to modify the amplitude of each of said oscillations during predetermined time intervals of a second oscillation of relatively low frequency to produce a resulting output voltage from each of said discriminators of amplitude variable in accordance with the frequency of the associated oscillation and undulating at said low frequency, and means to compare the amplitudes of said undulating voltages.

5. In combination, first and second oscillators to generate an oscillation of relatively high frequency, first and second frequency discriminators each responsive to an individual one of said high frequency oscillations and each operative to produce an output voltage of amplitude varying in accordance with the frequency of the associated oscillation, means to modify the amplitude of each of said oscillations during predetermined time intervals of a second oscillation of relatively low frequency to produce a resulting output voltage from each of said discriminators of amplitude variable in accordance with the frequency of the associated oscillation and undulating at said low frequency, means to produce a fluctuating voltage of said low frequency and of one phase or of opposite phase accordingly as the amplitude of one of said resulting output voltages is greater or less than the amplitude of the other of said resulting output voltages, and phase responsive means controlled by said fluctuating voltage to adjust the frequency of oscillation of one of said oscillators to maintain the amplitudes of said resulting voltages substantially identical.

6. In combination, means responsive to oscillations applied thereto of relatively high frequency characterized by their frequency and amplitude, said means being adapted to produce in response to said oscillations a unidirectional output voltage characterized by its amplitude, means to modify at least one of the characteristics of said oscillations during predetermined time intervals of an oscillation of relatively low frequency thereby to cause said output voltage to undulate at said low frequency, means to produce a second voltage of variable amplitude and undulating at said low frequency, and means to compare the amplitudes of said undulating voltages.

7. In combination, means responsive to oscillations applied thereto of relatively high frequency characterized by their frequency and amplitude, said means being adapted to produce in response to said oscillations a unidirectional output voltage characterized by its amplitude and polarity, means to modify at least one of the characteristics of said oscillations during predetermined time intervals of an oscillation of relatively low frequency thereby to modify at least one of the characteristics of said output voltage in order to produce a variable amplitude output voltage undulating at said low frequency and of one phase or of opposite phase depending upon the sense in which said one of said high frequency oscillation characteristics is modified, means to produce a second voltage of variable amplitude and phase and undulating at said low frequency, and means to compare the amplitude and phase of said undulating voltages.

8. In combination, means responsive to oscillations applied thereto of relatively high frequency characterized by their frequency and amplitude, said means being adapted to produce in response to said oscillations a unidirectional output voltage characterized by its amplitude, means to modify at least one of the characteristics of said oscillations during predetermined time intervals of an oscillation of relatively low frequency thereby to produce an output voltage undulating at said low frequency and of amplitude variable in accordance with the frequency of said high frequency oscillation, means to produce a second voltage of variable amplitude and undulating at said low frequency, means responsive to differences in the amplitudes of said undulating voltages, and means controlled by said last mentioned means to vary the amplitude of one of said undulating voltages to maintain equality of said amplitudes.

9. In combination, means responsive to oscillations applied thereto of relatively high frequency characterized by their frequency and amplitude, said means being adapted to produce in response to said oscillations a unidirectional output voltage characterized by its amplitude, means to modify at least one of the characteristics of said oscillations during predetermined time intervals of an oscillation of relatively low frequency thereby to produce an output voltage undulating at said low frequency and of amplitude variable in accordance with the frequency of said high frequency oscillation, means to produce a second voltage of variable amplitude and undulating at said low frequency, and means responsive to differences in the amplitudes of said undulating voltages to vary one of said undulating voltages as required to reduce said differences.

10. In combination, means responsive to oscillations applied thereto of relatively high frequency characterized by their frequency and amplitude, said means being adapted to produce in response to said oscillations a unidirectional output voltage characterized by its amplitude, means to modify at least one of the characteristics of said oscillations during predetermined time intervals of an oscillation of relatively low frequency thereby to produce an output voltage undulating at said low frequency and of amplitude variable in accordance with the frequency of said high frequency oscillating, means to produce a second voltage of variable amplitude but of opposite phase and undulating at said low frequency, a mixing amplifier having a first input circuit upon which said first mentioned undulating voltage is impressed and a second input circuit upon which said second mentioned undulating voltage is impressed and having a unidirectional voltage energized output circuit common to each of said input circuits, and means connected to the output circuits of said mixing amplifier to vary one of said undulating voltages as required to maintain a substantially steady current flow in said output circuit.

11. In combination, first and second balanced frequency discriminators each responsive to oscillations applied thereto of relatively high frequency characterized by their frequency and amplitude, each of said discriminators being adapted to produce in response to said oscillations a unidirectional output voltage characterized by its amplitude and polarity, means to modify at least one of the characteristics of each of said oscillations during predetermined time intervals of an oscillation of relatively low frequency thereby to modify at least one of the characteristics of each of said output voltages in order to produce discriminator output voltages undulating at said low frequency and of amplitude variable in accordance with the frequency of the associated high frequency oscillations, and means to compare the amplitudes of said undulating voltages.

12. In combination, first and second balanced frequency discriminators each responsive to oscillations applied thereto of relatively high frequency characterized by their frequency and amplitude, each of said discriminators being adapted to produce in response to said oscillations a unidirectional output voltage characterized by its amplitude and polarity, means to modify at least one of the characteristics of each of said oscillations during predetermined time intervals of an oscillation of relatively low frequency thereby to modify at least one of the characteristics of each of said output voltages in order to produce discriminator output voltages undulating at said low frequency and of amplitude variable in accordance with the frequency of the associated high frequency oscillations, means to compare the amplitudes of said undulating voltages, and means responsive to differences in the amplitudes of said undulating voltages to adjust the frequency of oscillation of one of said high frequency oscillations as required to reduce such differences.

13. In combination, a balanced frequency discriminator responsive to oscillations applied thereto of relatively high frequency characterized by their frequency and amplitude, said discriminator being adapted to produce in response to change in the frequency of oscillation of said oscillations from a predetermined value a unidirectional output voltage characterized by its amplitude and polarity, means to modify at least one of the characteristics of said oscillations during predetermined time intervals of an oscillation of relatively low frequency thereby to modify at least one of the characteristics of said output voltage in order to produce a discriminator output voltage undulating at said low frequency and of phase and amplitude in accordance with the direction and extent of change of the frequency of oscillation of said oscillations from said predetermined value, means to produce a second voltage of variable phase and amplitude and undulating at said low frequency, and means to compare the phase and amplitude of said undulating voltages.

14. In combination, a balanced frequency discriminator responsive to oscillations applied thereto of relatively high frequency characterized by their frequency and amplitude, said discriminator being adapted to produce in response to change in the frequency of oscillation of said oscillations from a predetermined value a unidirectional output voltage characterized by its amplitude and polarity, means to modify at least one of the characteristics of said oscillations during predetermined time intervals of an oscillation of relatively low frequency thereby to modify at least one of the characteristics of said output voltage in order to produce a discriminator output voltage undulating at said low frequency and of phase and amplitude in accordance with the direction and extent of change of the frequency of oscillation of said oscillations from said predetermined value, a network including a differential condenser adjustable to derive from an undulating voltage of said low frequency and of fixed phase and amplitude applied to said network a second voltage of variable phase and amplitude and undulating at said low frequency, and means to compare the phase and amplitude of said variable undulating voltages.

15. In combination, a non-balanced frequency discriminator responsive to oscillations applied thereto of relatively high frequency characterized by their frequency and amplitude, said discriminator being adapted to produce in response to said oscillations a unidirectional output voltage characterized by its amplitude, means to modify at least one of the characteristics of said oscillations during predetermined time intervals of an oscillation of relatively low frequency thereby to modify the amplitude of said output voltage in order to produce a discriminator output voltage undulating at said low frequency and of amplitude varying in accordance with the frequency of the associated high frequency oscillations, means to produce a second undulating voltage of variable amplitude and undulating at said low frequency, and means to compare the amplitudes of said undulating voltages.

16. In combination, a frequency discriminator responsive to oscillations applied thereto of relatively high frequency characterized by their frequency and amplitude, said discriminator being adapted to produce in response to said oscillations a unidirectional output voltage characterized by its amplitude, means to modify at least one of the chracteristics of said oscillations during predetermined time intervals of an oscillation of relatively low frequency thereby to modify the amplitude of said output voltage in order to produce a discriminator output voltage undulating at said low frequency and of amplitude varying in accordance with the frequency of the associated high frequency oscillations, a network including an adjustable potentiometer resistance to derive from an undulating voltage of said low frequency applied to said network a second undulating voltage of variable amplitude, and means to compare the amplitudes of said variable undulating voltages.

17. In combination, first and second non-balanced frequency discriminators each responsive to oscillations applied thereto of relatively high frequency characterized by their frequency and amplitude, each of said discriminators being adapted to produce in response to said oscillations a unidirectional output voltage characterized by its amplitude, means to modify at least one of the characteristics of each of said oscillations during predetermined time intervals of an oscillation of relatively low frequency thereby to modify the amplitude of each of said output voltages in order to produce discriminator output voltages undulating at said low frequency and of amplitude variable in accordance with the frequency of the associated high frequency oscillations, and means to compare the amplitudes of said undulating voltages.

18. In combination, first and second non-balanced frequency discriminators each responsive to oscillations applied thereto of relatively high frequency characterized by their frequency and amplitude, each of said discriminators being adapted to produce in response to said oscillations a unidirectional output voltage characterized by its amplitude, means to modify at least one of the characteristics of each of said oscillations during predetermined time intervals of an oscillation of relatively low frequency thereby to modify the amplitude of each of said output voltages in order to produce discriminator output voltages undulating at said low frequency and of amplitude variable in accordance with the frequency of the associated high frequency oscillations, means to compare the amplitudes of said undulating voltages, and means responsive to differences in the amplitudes of said undulating voltages to adjust the frequency of oscillation of one of said high frequency oscillations to reduce such differences.

19. Means to selectively control the energization of a reversible electrical motor for rotation in one direction or the other accordingly as the amplitude of one undulating voltage of predetermined frequency is greater or less than the amplitude of a second undulating voltage of the same frequency but of opposite phase including a pair of electronic valves each having an input circuit and a unidirectional voltage energized output circuit, a load impedance common to each of said output circuits, means to impress one of said undulating voltages on the input circuit of one of said valves and to impress the other of said undulating voltages on the input circuit of the other of said valves to produce an undulating voltage of said predetermined frequency across said load impedance accordingly as the amplitude of said first mentioned undulating voltage is less than or greater than the amplitude of said second mentioned undulating voltage, a reversible motor having a pair of windings on one of which an undulating voltage of said predetermined frequency is adapted to be impressed, and means responsive to the voltage produced across said load impedance to impress on the other of said windings an undulating voltage of said predetermined frequency and of one phase or of opposite phase relatively to the undulating voltage impressed on said one winding accordingly as an undulating voltage of said one phase or of opposite phase is produced across said load impedance.

RUDOLF F. WILD.